United States Patent [19]
Shimada

[11] Patent Number: 5,566,099
[45] Date of Patent: Oct. 15, 1996

[54] PSEUDORANDOM NUMBER GENERATOR

[75] Inventor: Michio Shimada, Tokyo, Japan

[73] Assignee: NEC Corporation, Tokyo, Japan

[21] Appl. No.: 310,998

[22] Filed: Sep. 22, 1994

[30]  Foreign Application Priority Data

Oct. 6, 1993 [JP] Japan .................................. 5-274935

[51] Int. Cl.$^6$ ............................... G06F 1/02; H04L 9/00; H03B 29/00
[52] U.S. Cl. ................. 364/717; 331/78; 380/46
[58] Field of Search ............................. 364/717; 331/78; 380/46, 20

[56]  References Cited

U.S. PATENT DOCUMENTS

| | | | |
|---|---|---|---|
| 4,760,559 | 7/1988 | Okamoto et al. | 380/48 |
| 5,046,036 | 9/1991 | Tezuka | 364/717 |
| 5,218,559 | 6/1993 | Angebaud et al. | 364/717 |
| 5,323,338 | 6/1994 | Hawthorne | 364/717 |
| 5,434,807 | 7/1995 | Yoshida | 364/717 |

OTHER PUBLICATIONS

Philip R. Geffe, "How to protect data with ciphers that are really hard to break", Electronics, Jan. 4, 1973, pp. 99–101.
T. Siegenthaler, "Correlation–Immunity of Nonlinear Combining Functions for Cryptographic Applications", IEEE Transactions on Information Theory, vol. IT–30, No. 5, pp. 776–780 (Sep. 1984).
Eiji Okamoto, "Introduction to Cryptograph Theory", Kyoritsu Shuppan Kabusiki Kaisya (1993) (ISBN 4–320–02633–0).

*Primary Examiner*—Roy N. Envall, Jr.
*Assistant Examiner*—Emmanuel L. Moise
*Attorney, Agent, or Firm*—Sughrue, Mion, Zinn, Macpeak & Seas

[57]  ABSTRACT

A pseudorandom number generator which uses linear feedback shift registers and a nonlinear function circuit and can make the conditioned output distribution of generated pseudorandom numbers uniform even if the conditioned output distribution of the nonlinear function circuit has some deviation. The generator has a shift register to which the output of the nonlinear function circuit is inputted as a serial input, an initial value setting circuit for setting random initial values to the linear feedback shift registers and the shift registers, and an adder for adding predetermined bits of the parallel outputs of the register and outputting a pseudorandom number stream. The generator can be used to generate a cryptogram which cannot be deciphered by the correlation attack method.

10 Claims, 3 Drawing Sheets

PSEUDORANDOM NUMBER GENERATOR

BACKGROUND OF THE INVENTION

1. Field of the Invention

This invention relates to a pseudorandom number generator, and more particularly to a pseudorandom number generator which is used to generate a pseudorandom number in a cryptographic communication apparatus or a like apparatus.

2. Description of the Related Art

In communication systems for telephone, data communication or television broadcasting, a crypro-graphic communication apparatus has been used so that transmission information may not be wiretapped by a third party. In the cryptographic communication apparatus, a pseudorandom number is generated using a pseudorandom number generator and added to transmission information by an exclusive OR operation to encipher the transmission information. One of known pseudorandom number generator employs a linear feedback shift register as disclosed, for example, in Japanese Patent Laid-Open No. Heisei 2-90320 (JP, A, 2-90320).

An example of the construction of a conventional pseudorandom number generator is shown in FIG. 1. The pseudorandom number generator 20 is a known apparatus constituted only from a linear feedback shift register and disclosed in various documents including, for example, Solomon W. Golomb, Lloyd R. Welch, Richard M. Goldstein, and Alfred W. Hales, "Shift Register Sequence (Revised Edition)," Aegean Park Press, 1982 or EiJi Okamoto, "Introduction to Cryprograph Theory," Kyoritsu Shuppan Kabushiki Kaisha, 1993.

The linear feedback shift register or pseudorandom number generator 20 shown in FIG. 1 includes a shift register 21 having a length of L bits and an exclusive OR circuit 22. The shift register 21 is connected to an initial value input terminal 23, a mode control signal input terminal 24 and a clock input terminal 25, and the series input terminal of the shift register 21 is connected to the output terminal 26 of the exclusive OR circuit 22. The initial input terminal 23 has a width of L bits and is used to preset an initial value to the shift register 21. Further, a predetermined one or plurality of ones of column outputs (parallel outputs) of the shift register 21 are connected to input terminals of the exclusive OR circuit 22. The exclusive OR circuit 22 outputs "1" or "0" depending upon whether the number of those inputs which have the value "1" is an odd number or an even number, respectively.

The shift register 21 stores an initial value of the L-bit width inputted from the initial value input terminal 23 in synchronism with a clock pulse signal CLK inputted from the clock input terminal 25 when the mode control signal MODE inputted from the mode control signal input terminal 24 is "1." When the mode control signal MODE is "0," each time the clock pulse signal CLK is inputted, the shift register 21 shifts its stored bit string by one bit rightwardly and stores a signal appearing at the series input terminal into the bit at the left end.

When the pseudorandom number generator (linear feedback shift register) 20 is used, an L-bit random number to be used as an initial value is first supplied to the initial value input terminal 23 and the mode control signal MODE is set to "1," and a clock pulse signal CLK is supplied so that the random number is stored as an initial value into the shift register 21.

In order to generate a pseudorandom number, the mode control signal MODE is changed to "0" and a clock signal is supplied to the clock terminal 25. As a result, each time a clock pulse is inputted, the L-bit information stored in the shift register 21 is shifted as a whole by one bit rightwardly, whereupon one bit at the right end is abandoned, while an output signal of one bit of the exclusive OR circuit 22 is stored into the one bit at the left end of the shift register. The output bit stream of the exclusive OR circuit 22 is then outputted as a pseudorandom number to the outside by way of the output terminal 26.

The pseudorandom number generator shown in FIG. 1 is a so-called M sequence generation circuit and is disadvantageous in that the thus-produced pseudorandom numbers are unsatisfactory in random degree and in that, if some of pseudorandom number series are discovered, an initial state of the linear feedback shift register can be readily presumed by establishing a linear equation, thereby allowing a third party to decipher the cryprograph.

Therefore, another generator has been developed wherein, as shown in FIG. 2, a plurality of linear feedback shift registers are prepared and outputs of the feedback shift registers are coupled by a nonlinear function circuit to obtain a pseudorandom number. The pseudorandom number generator 30 is disclosed in various documents including, for example, Philip R. Geffe, "How to protect data with ciphers that are really hard to break," Electronics, Jan. 4, 1973, pp. 99–101, or the above-mentioned book by Eiji Okamoto. The pseudorandom number generator 30 includes a plurality of linear feedback shift registers $31_1$ to $31_n$ and a nonlinear function circuit 32 which couples output signals of the feedback shift registers $31_1$ to $31_n$ and outputs a resulting signal as a pseudorandom number to an output terminal 36. While the construction of each of the linear feedback shift registers $31_1$ to $31_n$ is similar to that of the linear feedback shift register (pseudorandom number generator 20) shown in FIG. 1, the shift registers do not necessarily have an equal length. Here, the register lengths of the linear feedback shift registers $31_1$ to $31_n$ are $L_1$ bits . . . , and $L_n$ bits, respectively. For the linear feedback shift registers $31_1$ to $31_n$, an initial value input terminal 33 for presetting an initial value, a mode control signal input terminal 34 to which a mode control signal MODE is inputted and a clock input terminal 36 to which a clock pulse signal CLK is inputted are provided in common.

The nonlinear function circuit 32 provides an output whose relationship to the input cannot be represented sufficiently only by exclusive OR, and may be constructed from a logic circuit or in the form of a look-up table using a read only memory (ROM). FIG. 3 shows an example of the construction of the nonlinear function circuit 32 constituted from a 3-input logic circuit where three linear feedback shift registers are provided (n=3).

Referring to FIG. 3, the nonlinear function circuit 32 includes a pair of 2-input AND circuits 321 and 323, an inverter circuit 322 and a 2-input OR circuit 324. The first AND circuit 321 inputs output bit streams of the first and second linear feedback shift registers by way of input terminals 325 and 326 and outputs the AND of them. The inverter 322 inputs the output bit stream of the second linear feedback shift register inputted by way of the input terminal 326, logically inverts the bit stream and outputs a resulting bit stream. The second AND circuit 323 inputs an output bit stream of the third linear feedback shift register inputted by way of a further input terminal 327 and the bit stream from the inverter 322 and outputs the AND of the inputted bit streams. The OR circuit 324 logically ORs the output bit streams from the AND circuits 321 and 323 and outputs the OR signal between them to the outside by way of an output terminal 328.

When a pseudorandom number is to be generated using the pseudorandom number generator 30 shown in FIG. 2, random numbers of $L_1$ bits, $L_2$ bits , . . . and $L_n$ bits are first supplied as initial values to the linear feedback shift registers $31_1$ to $31_n$, respectively, by way of the initial value input terminal 33, and the mode control signal MODE of "1" is inputted to the linear feedback shift registers $31_1$ to $31_n$ by way of the mode control signal input terminal 34. Further, a clock pulse signal CLK is supplied by way of the clock input terminal 35 so that the initial values are stored into the linear feedback shift registers $31_1$ to $31_n$ in synchronism with the clock pulse signal CLK. Then, the mode control signal MODE is changed to "0" and a clock signal is inputted by way of the clock input terminal 35 so that, similarly as in FIG. 1, a pseudorandom number stream is outputted serially from the linear feedback shift registers $31_1$ to $31_n$. The nonlinear function circuit 32 couples the output bit streams from the linear feedback shift registers $31_1$ to $31_n$ with a nonlinear function to finally produce a pseudorandom number and outputs the pseudorandom number to the output terminal 36.

Since the pseudorandom number generator outputs a pseudorandom number obtained by coupling with a nonlinear function, it is difficult to presume initial states of the linear feedback shift registers. However, it is known that, when the pseudorandom number generator is applied to a cryptographic communication apparatus wherein a pseudorandom number is added to transmission data to encipher the transmission data, if there is some deviation in the output distribution when some inputs to the nonlinear function circuit 32 are conditioned, then the enciphered transmission data can be deciphered by a deciphering method known as "correlation attack" or "serial correlation." Details about correlation attack are described in T. Siegenthaler, "Correlation-Immunity of Nonlinear Combining Functions for Cryptographic Applications." IEEE Transactions on Information Theory, Vol. IT-30, No. 5, pp. 776–780, September 1984, or in the book by Eiji Okamoto mentioned above.

In order to prevent decipherment by correlation attack, the nonlinear function circuit 32 should be designed so that the conditioned output distribution thereof may be uniform when some inputs to the nonlinear function circuit 32 are conditioned. However, where the number of bits of inputs to the nonlinear function circuit 32 is small, for example 3 bits, the conditioned output distribution cannot be made uniform. Accordingly, the pseudorandom number generator 30 of the construction wherein the outputs of the plurality of linear feedback shift registers $31_1$ to $31_n$ are coupled by the nonlinear function circuit 32 is disadvantageous in that it is impossible to realize a cryptographic communication apparatus which is small in apparatus scale and safe.

Please note that the conditioned output distribution of the nonlinear function circuit is hereinafter referred to as "conditioned output distribution."

SUMMARY OF THE INVENTION

It is an object of the present invention to provide a pseudorandom number generator which makes it difficult to presume initial conditions by correlation attack.

The object of the present invention is achieved by a pseudorandom number generator comprising a plurality of linear feedback shift registers which operate in synchronism with each other in response to a clock inputted in common to the linear feedback shift registers, a nonlinear function circuit for coupling output bit streams of the linear feedback shift registers with a nonlinear function and outputting a resulting bit stream, a shift register which operates in synchronism with the clock and inputs an output of the nonlinear function circuit as a serial input, setting means for setting initial values to the linear feedback shift registers and the shift register, and addition means for inputting a predetermined plurality of stored bits of the shift register and outputting a pseudorandom number string in accordance with input values thereto in synchronism with the clock.

The object of the present invention is achieved also by a pseudorandom number generator, comprising a plurality of linear feedback shift registers which operate in synchronism with each other in response to a clock inputted in common to the linear feedback shift registers, a nonlinear function circuit for coupling output bit strings of the linear feedback shift registers with a nonlinear function and outputting a resulting bit string, a shift register which operates in synchronism with the clock and inputs an output of the nonlinear function circuit as a serial input, setting means for setting initial values to the linear feedback shift registers and the shift register, and addition means for inputting a predetermined one or plurality of stored bits of the shift register and the output of the nonlinear function circuit and outputting a pseudorandom number string in accordance with input values thereto in synchronism with the clock.

The probability that the number of "1" present in a binary random number of a length of L bits is an odd number gradually approaches ½ as L increases unless the probability of appearance of "1" is equal to 0. Accordingly, by inputting and storing a random number, which has some deviation in probability of appearance of "0" or "1" , as an initial value to and into a shift register and then adding the pseudorandom number from the shift register by addition to modulus 2, a random number which has no deviation in probability of appearance of "0" or "1" can be obtained. This method is used to make uniform the output distribution of random numbers generated by physical means and is already known (refer to, for example, the book by Eiji Okamoto mentioned hereinabove). Since a pseudorandom number generator should be designed so that the output distribution may be uniform, it may appear that application of the method cannot have a significant effect. Actually, however, application of the method not only makes the output distribution uniform but also makes the conditioned output distribution uniform.

The present invention makes use of this method and makes the conditioned output distribution of a nonlinear function circuit uniform by inputting an output bit stream of the nonlinear function circuit to a shift register and adding the output bit stream of the nonlinear function circuit and all or part of bit outputs of the shift register by modulo-2 addition by means of an adder. However, if a stored condition of the shift register at a certain point of time is known, then the value of a bit to be newly inputted from the nonlinear function circuit to the shift register may be known from the output of the adder. Accordingly, even if the conditioned output distribution of the nonlinear function circuit is made uniform using the method and an output random number of the adder is added to transmission information to encipher the transmission information, the resulting cryprograph can still be deciphered by correlation attack if only the initial condition (initial value) of the shift register is found out.

Therefore, according to the present invention, before a pseudorandom number is generated, a random number is set as an initial value to the shift register by setting means. This makes it impossible for a third party to find out the output of the nonlinear function circuit. However, where length of the shift register is short, the initial value of the shift register may possibly be presumed by trial and error, and therefore, the length of the shift register is preferably set to a bit length which substantially makes it impossible to presume the initial value by thorough trial and error using a computer.

In this manner, in the present invention, since an output bit stream of the nonlinear function circuit is convoluted by the shift register and the adder to output a pseudorandom number from the adder, the conditioned output distribution of pseudorandom numbers can be made uniform even where the nonlinear function circuit has some deviation in conditioned output distribution.

The above and other objects, features and advantages of the present invention will become apparent from the following description referring to the accompanying drawings which illustrate an example of a preferred embodiment of the present invention.

DESCRIPTION OF THE EMBODIMENT

Figure 4:
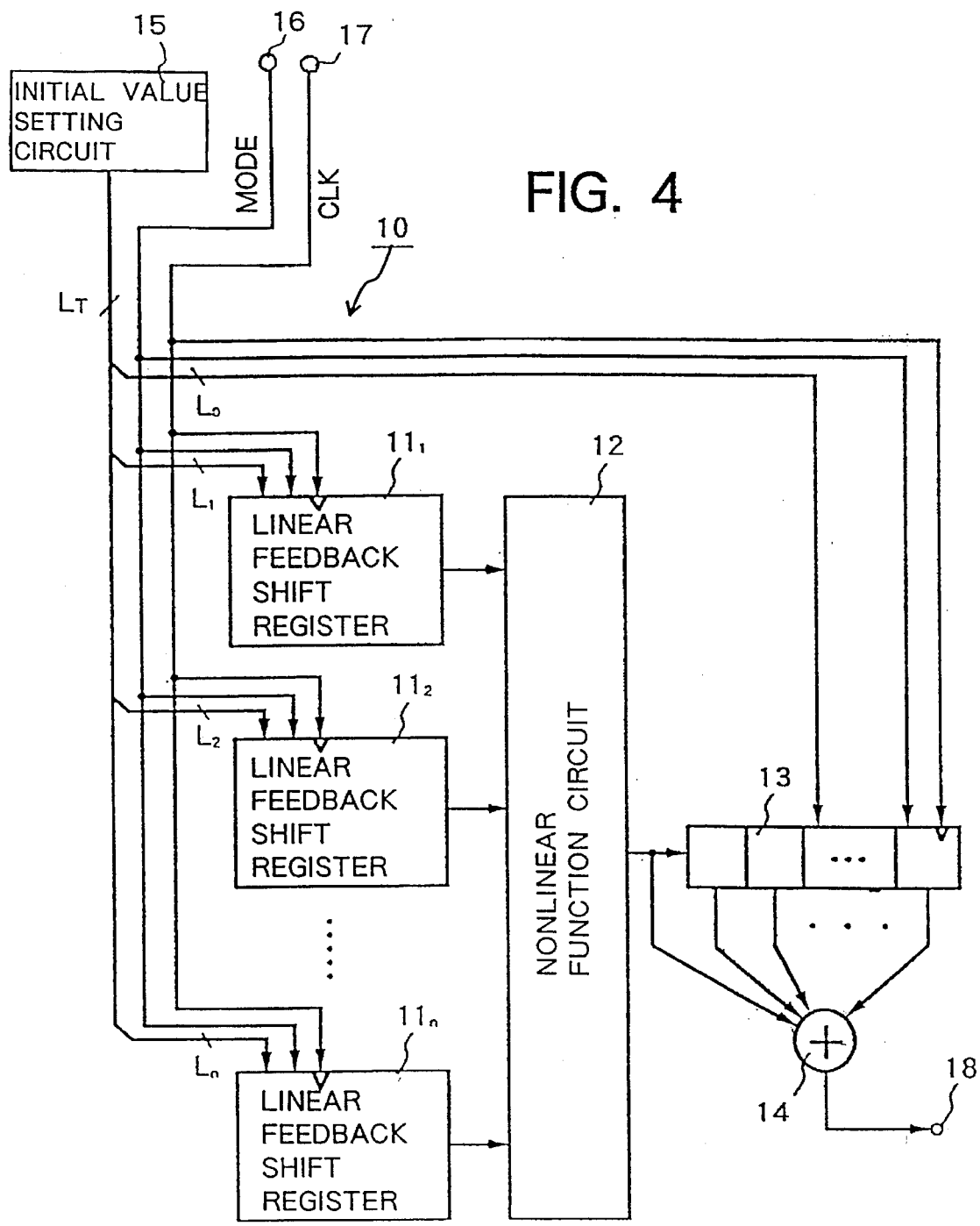
FIG. 4 is a block diagram showing the construction of a pseudorandom number generator of a preferred embodiment of the present invention.

The pseudorandom number generator 10 shown in FIG. 4 includes n (n is an integral number equal to or greater than 2) linear feedback shift registers $11_1$ to $11_n$, a nonlinear function circuit 12 for coupling output bit streams of the linear feedback shift registers $11_1$ to $11_n$ with a nonlinear function and outputting a resulting output bit stream, a shift register 13 to which the output bit stream of the nonlinear function circuit 12 is inputted, an adder 14 for inputting and adding a predetermined plurality of stored bit outputs of the shift register 13 and the output of the nonlinear function circuit 12, and an initial value setting circuit 15 for setting initial values.

Figure 1:
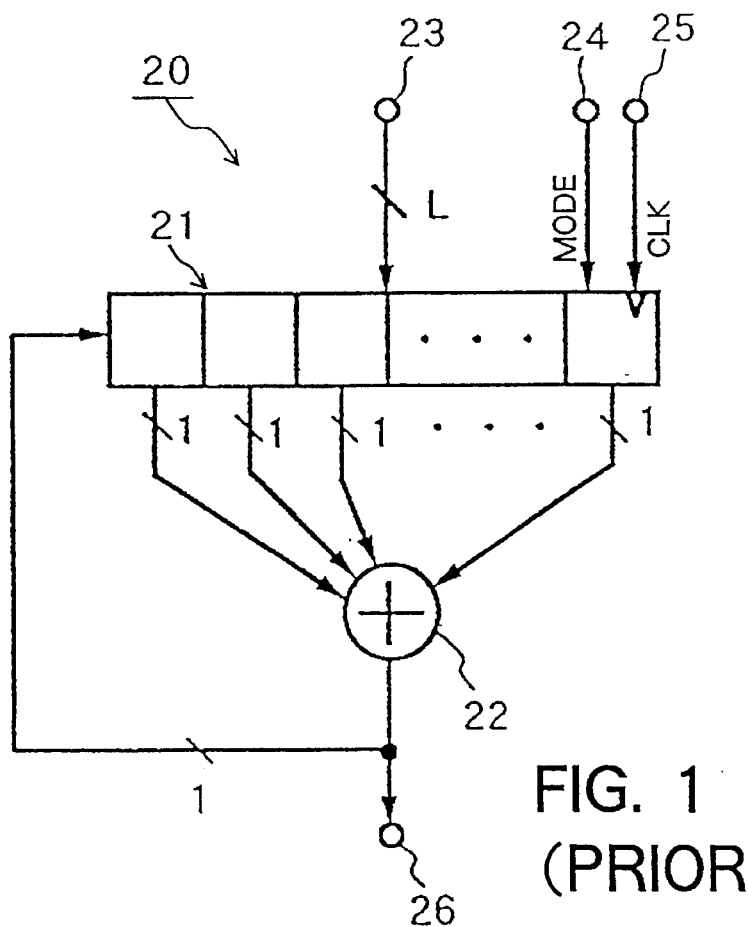
FIG. 1 is a block diagram showing the construction of a conventional pseudorandom number generator in which a linear feedback shift register is employed.
Figure 3:
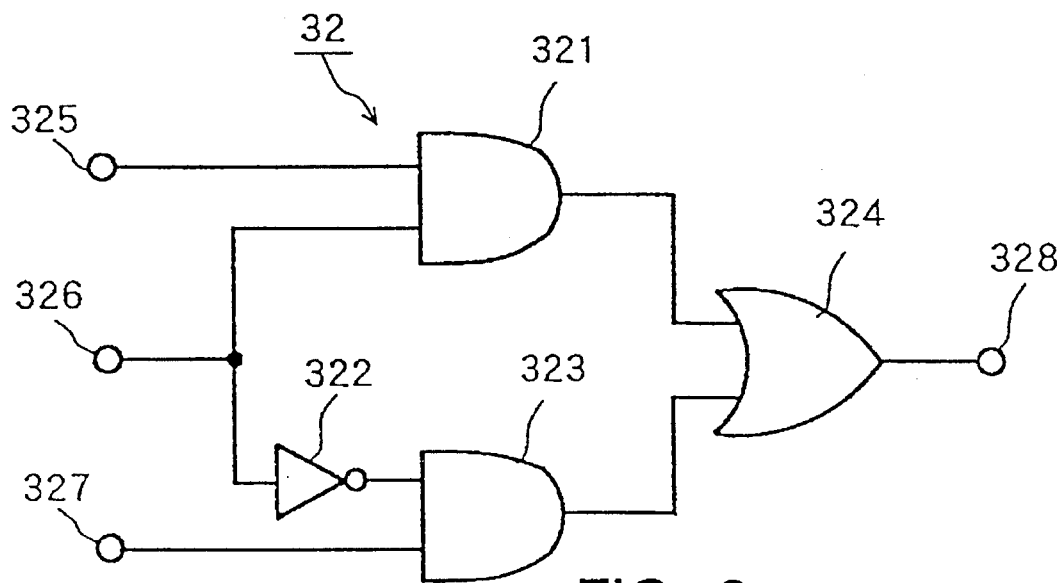
FIG. 3 is a circuit diagram showing an example of a nonlinear function circuit.
Figure 2:
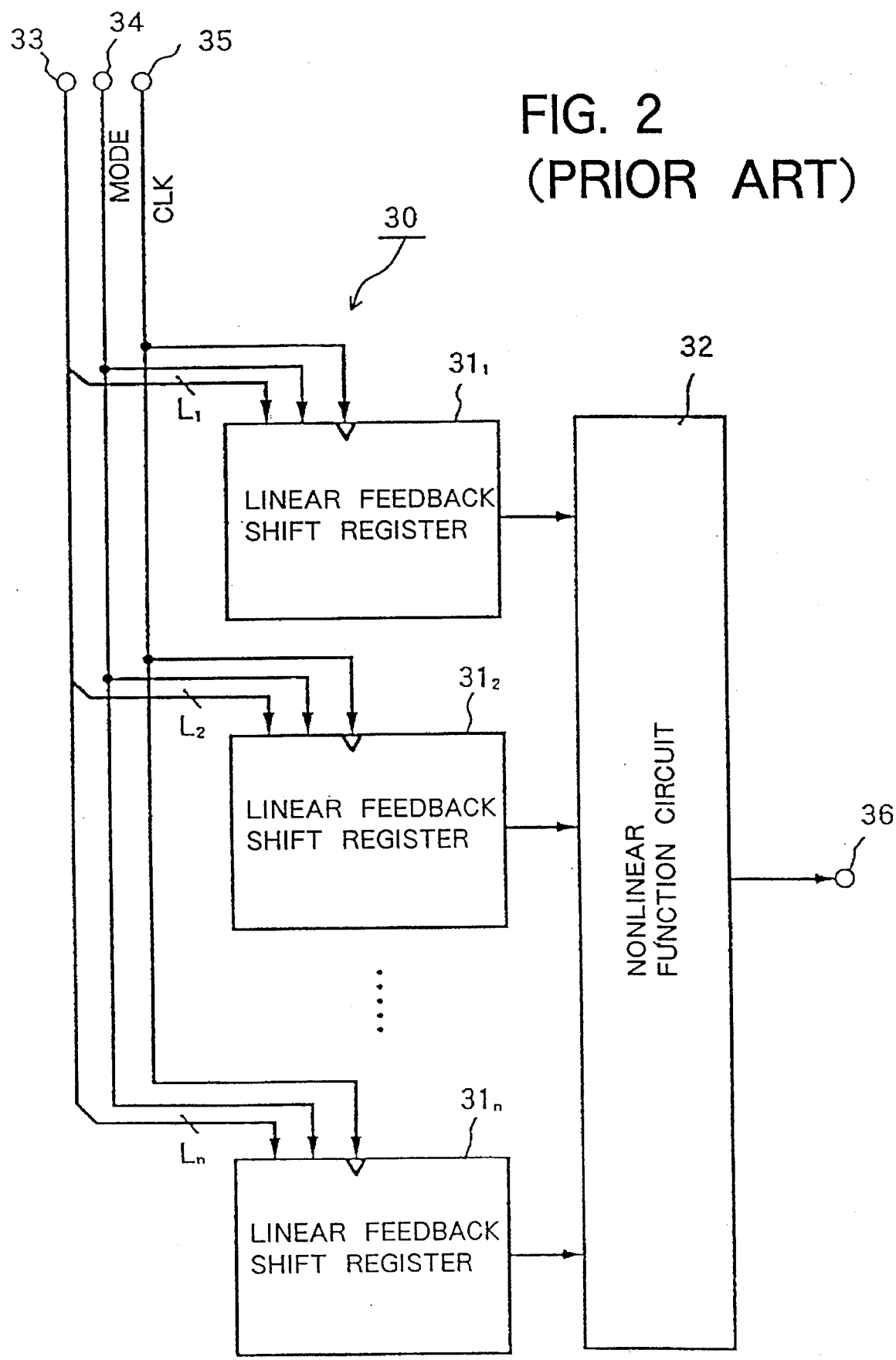
FIG. 2 is a block diagram showing the construction of another conventional pseudorandom number generator in which a plurality of linear feedback shift registers and a nonlinear function circuit are employed.

Each of the linear feedback shift registers 111 to $11_n$ has the same construction as the linear feedback shift register shown in FIG. 1. In particular, each of the linear feedback shift registers $11_1$ to $11_n$ includes a shift register and an adder and is constructed so that the exclusive OR of a predetermined one or plurality of bits of parallel outputs of the shift register is calculated by the adder and outputted. The result of the exclusive OR calculation is inputted to the serial input terminal of the shift register. The shift registers built in the linear feedback shift registers $11_1$ to $11_n$ have a bit lengths of $L_1$ bits, $L_2$ bits ..., $L_n$ bits. Here, if, for example, n=5, the bit lengths $L_1$ to $L_n$ are set within the range from 16 bits to 30 bits normally so that they are different from one another. It is to be noted that some of the linear feedback shift registers may have built-in shift registers of an equal length.

The initial value setting circuit 15 generates and outputs random numbers as initial values to the linear feedback shift registers $11_1$ to $11_n$ and the shift register 13. The bit width $L_T$ of the initial value setting circuit 15 satisfies $L_T=L_0+L_1+L_2+\ldots+L_n$, and portions of the $L_1$ bits, the $L_2$ bits, ... and the $L_n$ bits of the outputs of the initial value setting circuit 15 are supplied to the linear feedback shift registers $11_1$, $11_2$, ..., $11_n$, respectively, while the portion of the $L_0$ bits is supplied to the shift register 13. Consequently, the initial values can be set independently of one another to the linear feedback shift registers $11_1$ to $11_n$ and the shift register 13.

Further, the pseudorandom number generator 10 has a mode control signal input terminal 16 to which a mode control signal MODE is inputted and a clock input terminal 17 to which a clock pulse signal CLK is inputted. These input terminals 16 and 17 are provided in common for the linear feedback shift registers $11_1$ to $11_n$ and the shift register 13. When the mode control signal MODE is "1," the linear feedback shift registers $11_1$ to $11_n$ and the shift register 13 store the initial values from the initial value setting circuit 15 in synchronism with the clock pulse signal CLK, but when the mode control signal MODE is "0," the linear feedback shift registers $11_1$ to $11_n$ and the shift register 13 perform individual shifting operations in synchronism with the clock pulse signal CLK.

The bit length $L_0$ of the shift register 13 is set to at least 30 to 60 bits so that the initial values may not substantially be presumed even by thorough trial and error by a computer.

The adder 14 inputs an output bit stream of the nonlinear function circuit 12 and a predetermined one or plurality or all of the parallel outputs of the shift register 13 to effect modulo-2 addition of the output bit stream and the parallel outputs. The adder 14 is constituted from an exclusive OR circuit or an exclusive NOR circuit. An output bit stream of the adder 14 is a pseudorandom number string to be outputted to the pseudorandom number generator 10. In the example shown here, while predetermined parallel outputs of the shift register 13 are inputted to the adder 14, the bits to be inputted to the adder 14 can be set arbitrarily. In particular, two or more predetermined bits selected from the one-bit output of the nonlinear function circuit 12 and the $L_0$-bit parallel outputs of the shift register 13 should be inputted to the adder 14.

Next will be described the generation of pseudorandom number by the pseudorandom number generator 10.

First, the mode control signal MODE to be inputted from the mode control signal input terminal 16 is set to "1" and a clock pulse is inputted so that those random number portions of $L_1$ bits, $L_2$ bits, ... and $L_n$ bits of an $L_T$-bit random number generated by the initial value setting circuit 15 are stored as initial values into the shift registers in the linear feedback shift registers $11_1$, $11_2$, ... and $11_n$, respectively, while the other random number portion of $L_0$ bits is stored as an initial value into the shift register 13. In this instance, the nonlinear function circuit 12 couples the bits outputted from the linear feedback shift registers $11_1$ to $11_n$ in accordance with the initial values with a predetermined nonlinear function and outputs a resulting bit value. The output value is determined as a first value. Meanwhile, the adder 14 inputs the output bit of the nonlinear function circuit 12 and the predetermined bits of the initial value of the shift register 13, performs modulo-2 addition of the thus inputted bits and outputs the result of the addition to an output terminal 18.

Thereafter, the mode control signal MODE is changed to "0." Consequently, each time a clock pulse is thereafter inputted by way of the clock input terminal 17, the initial values stored in the shift registers in the linear feedback shift registers $11_1$ to $11_n$ are shifted by one bit rightwardly, whereupon the 1 bit at the right end is abandoned, and the output bit of the adder in the feedback shift register is stored into the one bit at the left end of the built-in shift register and outputted to the nonlinear function circuit 12 outside the pseudorandom number generator 10. Consequently, the nonlinear function circuit 12 outputs a second value in accordance with the second output bit values of the 11near feedback shift registers $11_1$ to $11_n$. In addition, since the shift register 13 is driven by the same clock pulse signal CLK to the linear feedback shift registers $11_1$ to $11_n$, the shift register 13 shifts the stored initial value of the bit length $L_0$ by one bit rightwardly, whereupon it abandons the one bit at the right end and fetches one bit of the output (the first value mentioned above) of the nonlinear function circuit 12 to the one bit at the left end. As a result, the adder 14 inputs the second value outputted from the nonlinear function circuit 12 and the predetermined output bits of the $L_0$-bit parallel outputs of the shift register 13 after the shifting operation, performs modulo-2 addition of the input bits and outputs a resulting bit value to the output terminal 18.

Thereafter, while the value of the mode control signal is held to "0," each time a clock pulse of a clock pulse signal of the frequency of, for example, 20 MHz is inputted, a pseudorandom number is outputted one bit by one bit to the output terminal 18 in a similar manner as described above. Here, since the clock pulse signal CLK is supplied in common, the linear feedback shift registers $11_1$ to $11_n$ and the shift register 13 operate in a synchronized relationship with each other.

In the present pseudorandom number generator, since the output bit stream of the nonlinear function circuit 12 is convoluted by the shift register 13 and the adder 14 to output a pseudorandom number from the adder 14, the conditioned output distribution of pseudorandom numbers to be generated can be made uniform even if the conditioned output distribution of the nonlinear function circuit 12 has some deviation. Accordingly, where pseudorandom numbers generated by the pseudorandom number generator are used to generate cryptographs, even if the nonlinear function circuit is small in apparatus scale such that, for example, it has three inputs, cryptographs cannot be deciphered even using correlation attack.

It is to be understood that variations and modifications of a pseudorandom number generator disclosed herein will be evident to those skilled in the art. It is intended that all such modifications and variations be included within the scope of the appended claims.

What is claimed is:

1. A pseudorandom number generator, comprising:

a plurality of linear feedback shift registers which operate in synchronism with each other in response to a clock inputted in common to the linear feedback shift registers;

a nonlinear function circuit for coupling output bit streams of the linear feedback shift registers with a nonlinear function and outputting a resulting bit stream;

a shift register which operates in synchronism with the clock and inputs an output of the nonlinear function circuit as a serial input;

setting means for setting initial values to the linear feedback shift registers and the shift register; and addition means for inputting a predetermined plurality of stored bits of the shift register and outputting a pseudorandom number string in accordance with input values thereto in synchronism with the clock.

2. The pseudorandom number generator of claim 1, wherein the addition means adds the input values by modulo-2 addition and outputs a result of the addition.

3. The pseudorandom number generator of claim 1, wherein at least one of the linear feedback shift registers has a built-in shift register having a different length from that of built-in shift registers of the other linear feedback shift registers.

4. The pseudorandom number generator of claim 1, wherein the shift register has a bit length which makes it substantially impossible to presume initial values of the linear feedback shift registers by a search based on trial and error using a computer.

5. A pseudorandom number generator, comprising:

a plurality of linear feedback shift registers which operate in synchronism with each other in response to a clock inputted in common to the linear feedback shift registers;

a nonlinear function circuit for coupling output bit streams of the linear feedback shift registers with a nonlinear function and outputting a resulting bit stream;

a shift register which operates in synchronism with the clock and inputs an output of the nonlinear function circuit as a serial input;

setting means for setting initial values to the linear feedback shift registers and the shift register; and addition means for inputting a predetermined one or plurality of stored bits of the shift register and the output of the nonlinear function circuit and outputting a pseudorandom number string in accordance with input values thereto in synchronism with the clock.

6. The pseudorandom number generator of claim 5, wherein the addition means adds the input values by modulo-2 addition and outputs a result of the addition.

7. The pseudorandom number generator of claim 5, wherein at least one of the linear feedback shift registers has a built-in shift register having a different length from that of built-in shift registers of the other linear feedback shift registers.

8. The pseudorandom number generator of claim 5, wherein the setting means is capable of setting initial values independent of each other to the plurality of linear feedback shift registers and the shift register.

9. The pseudorandom number generator of claim 5, wherein the shift register has a bit length which makes it substantially impossible to presume initial values of the linear feedback shift registers by a search based on trial and error using a computer.

10. The pseudorandom number generator of claim 9, wherein the bit length of the shift register is equal to or greater than 30 bits.

* * * * *